US008345591B2

(12) United States Patent
MacInnis et al.

(10) Patent No.: US 8,345,591 B2
(45) Date of Patent: Jan. 1, 2013

(54) METHOD AND SYSTEM FOR UTILIZING PLURALITY OF PHYSICAL LAYERS TO RETAIN QUALITY OF SERVICE IN A WIRELESS DEVICE DURING A COMMUNICATION SESSION

(75) Inventors: Alexander G. MacInnis, Ann Arbor, MI (US); Thomas Quigley, Franklin, NC (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 949 days.

(21) Appl. No.: 11/864,269

(22) Filed: Sep. 28, 2007

(65) Prior Publication Data
US 2009/0023454 A1 Jan. 22, 2009

Related U.S. Application Data

(60) Provisional application No. 60/950,953, filed on Jul. 20, 2007.

(51) Int. Cl.
*H04B 7/185* (2006.01)
(52) U.S. Cl. ........ 370/318; 370/347; 370/401; 370/443; 370/450; 455/460; 455/524; 455/464
(58) Field of Classification Search .................. 370/318, 370/347, 389, 401, 441, 442, 443, 444, 447, 370/461, 450; 455/460, 524, 525, 464
See application file for complete search history.

(56) References Cited

U.S. PATENT DOCUMENTS
6,157,837 A * 12/2000 Kato et al. .................... 455/437
(Continued)

FOREIGN PATENT DOCUMENTS
CN 1711750 12/2005
(Continued)

OTHER PUBLICATIONS

Seagate Technology LLC, Seagate D.A.V.E. (Digital Audio Video Experience) Transform the consumer digital content experience with the Seagate D.A.V.E. design concept, Data Sheet, 2007.

(Continued)

*Primary Examiner* — Ayaz Sheikh
*Assistant Examiner* — Andrew C Lee
(74) *Attorney, Agent, or Firm* — Thomas | Horstemeyer, LLP

(57) ABSTRACT

A wireless mobile communication (WMC) device may be determine a quality of service (QOS) required to communicate data. The WMC device may utilize a plurality of physical layers available in the WMC device to retain the QOS throughout the data communication. The physical layers may comprise a plurality of wireless technologies and/or a plurality of transmission power levels within each wireless technology. Selection of physical layers that may be utilized may comprise determination of available QOS through the physical layers, available power in the WMC device, and/or power requirement for communicating data via the physical layers. Data encoding may also be utilized to alter size of communicated data while retaining the required QOS. Data encoding may comprise utilizing encoding schemes, data compression, and/or redundancy bits. A set of deadlines may be utilized to enable switching between available physical layers to ensure maintaining and/or achieving required QOS.

24 Claims, 5 Drawing Sheets

U.S. PATENT DOCUMENTS

| | | | |
|---|---|---|---|
| 6,522,628 B1* | 2/2003 | Patel et al. ............... | 370/230.1 |
| 6,542,490 B1* | 4/2003 | Ahmadvand et al. ......... | 370/338 |
| 6,654,363 B1* | 11/2003 | Li et al. .................... | 370/338 |
| 6,765,909 B1* | 7/2004 | Sen et al. ................... | 370/392 |
| 6,807,426 B2* | 10/2004 | Pankaj ....................... | 455/453 |
| 6,909,905 B2* | 6/2005 | Umeda et al. ................ | 455/522 |
| 6,985,932 B1 | 1/2006 | Glaser et al. | |
| 6,999,432 B2* | 2/2006 | Zhang et al. ................ | 370/328 |
| 7,013,149 B2 | 3/2006 | Vetro et al. | |
| 7,185,257 B2* | 2/2007 | Kim et al. .................. | 714/751 |
| 7,248,858 B2* | 7/2007 | Barber et al. ............. | 455/414.1 |
| 7,269,151 B2* | 9/2007 | Diener et al. .............. | 370/329 |
| 7,406,324 B1* | 7/2008 | McConnell .................. | 455/466 |
| 7,519,019 B2* | 4/2009 | Yoon et al. ................. | 370/328 |
| 7,546,126 B2* | 6/2009 | Beasley et al. ............. | 455/436 |
| 7,818,018 B2* | 10/2010 | Nanda et al. ................ | 455/509 |
| 2002/0059434 A1 | 5/2002 | Karaoguz et al. | |
| 2003/0093526 A1* | 5/2003 | Nandagopalan et al. ..... | 709/225 |
| 2003/0187952 A1 | 10/2003 | Young et al. | |
| 2004/0015562 A1 | 1/2004 | Harper et al. | |
| 2004/0093432 A1 | 5/2004 | Luo et al. | |
| 2004/0210657 A1 | 10/2004 | Narayanan et al. | |
| 2005/0041746 A1* | 2/2005 | Rosen et al. ................ | 375/242 |
| 2005/0053003 A1* | 3/2005 | Cain et al. .................. | 370/235 |
| 2005/0124372 A1* | 6/2005 | Lundby et al. .............. | 455/522 |
| 2005/0185653 A1 | 8/2005 | Ono et al. | |
| 2005/0271009 A1* | 12/2005 | Shirakabe et al. ........... | 370/329 |
| 2006/0031509 A1 | 2/2006 | Ballette et al. | |
| 2006/0212451 A1 | 9/2006 | Serdy et al. | |
| 2006/0221998 A1* | 10/2006 | Livet et al. ................. | 370/464 |
| 2006/0274869 A1 | 12/2006 | Morse | |
| 2006/0291483 A1* | 12/2006 | Sela ........................... | 370/401 |
| 2007/0027839 A1 | 2/2007 | Ives | |
| 2007/0067305 A1 | 3/2007 | Ives | |
| 2007/0121536 A1 | 5/2007 | Aihara | |
| 2008/0008116 A1* | 1/2008 | Buga et al. .................. | 370/328 |
| 2008/0040417 A1 | 2/2008 | Juncker | |
| 2008/0101291 A1* | 5/2008 | Jiang et al. ................. | 370/331 |
| 2008/0198814 A1* | 8/2008 | Wengerter et al. ........... | 370/336 |
| 2008/0207253 A1* | 8/2008 | Jaakkola et al. ............ | 455/550.1 |
| 2008/0253351 A1* | 10/2008 | Pernu et al. ................. | 370/345 |
| 2008/0259846 A1 | 10/2008 | Gonikberg et al. | |
| 2008/0273493 A1* | 11/2008 | Fong .......................... | 370/330 |
| 2008/0280630 A1* | 11/2008 | Kalhan et al. ............... | 455/458 |
| 2008/0310338 A1* | 12/2008 | Charpenter et al. ......... | 370/315 |
| 2009/0036139 A1* | 2/2009 | Usuda et al. ................ | 455/450 |
| 2009/0168701 A1* | 7/2009 | White et al. ................ | 370/328 |
| 2010/0014487 A1* | 1/2010 | Attar et al. .................. | 370/335 |
| 2010/0182957 A1* | 7/2010 | Lundby et al. .............. | 370/328 |
| 2011/0182243 A1* | 7/2011 | Gallagher et al. ........... | 370/328 |

FOREIGN PATENT DOCUMENTS

| | | |
|---|---|---|
| CN | 1868231 | 11/2006 |
| CN | 1878090 | 12/2006 |
| DE | 102005031390 | 1/2007 |
| EP | 1130506 | 9/2001 |
| KR | 2002-056213 | 7/2002 |
| KR | 2004-0021179 | 3/2004 |
| KR | 2006-0084854 | 7/2006 |
| WO | WO9839938 | 11/1998 |
| WO | WO0230133 | 4/2002 |
| WO | WO2004008693 | 1/2004 |
| WO | WO2004031488 | 4/2004 |
| WO | WO2005112419 | 11/2005 |

OTHER PUBLICATIONS

Seagate Technology LLC, Seagate D.A.V.E. (Digital Audio Video Experience) The portable storage platform that collects, plays and manages digital content, Product Overview, 2007.

EPO Communication dated Apr. 6, 2011 in Application No. 08011185.9-2412 / 2018006.

EPO Communication dated Aug. 10, 2010 in Application No. 08 011 082.8-1244.

European Search Report corresponding to European Application Serial No. 08011082.8-1244, dated Mar. 10, 2009.

* cited by examiner

METHOD AND SYSTEM FOR UTILIZING PLURALITY OF PHYSICAL LAYERS TO RETAIN QUALITY OF SERVICE IN A WIRELESS DEVICE DURING A COMMUNICATION SESSION

CROSS-REFERENCE TO RELATED APPLICATIONS/INCORPORATION BY REFERENCE

This patent application makes reference to, claims priority to and claims benefit from U.S. Provisional Application Ser. No. 60/950,953 filed on Jul. 7, 2007 Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for utilizing plurality of physical layers to retain quality of service in a wireless device during a single communication session.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intended to add an element of mobility to the traditional telephony service, this technology has grown beyond that initial purpose. Many modern cellular technologies, including such technologies as GSM/GPRS/EDGE, UMTS, and/or CDMA2000, incorporate substantial data capabilities. Most of today's cellular services comprise such features as text messaging, audio/video streaming, and web browsing.

Some WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, cellular technology may allow use of the mobile phone as a form of wireless modem that allows connecting a laptop, for example, to the internet via a cellular network.

Devices aimed at taking advantage of the capabilities of wireless networks may be described as wireless mobile communication (WMC) devices. Today's WMC device may comprise such devices as cellular phones, PDA's, laptops, and/or other devices.

WMC devices are typically designed to be carried around, and used on the move; therefore, physical limitations remain a major consideration in designing these devices. Increases in the size and weight of WMC devices may be disfavored; rather, decreasing the size and weight of WMC device may be more consistent with the convenient use of WMC devices. Subsequently, there is a limit on the amount of processing and storage that can be packed into WMC devices without causing increase in size and weight. Increases in processing and/or storage generally require use of additional components; however, WMC devices' manufactures generally shy away from putting too many components in these devices because of said physical limitations. Therefore, despite the general rapid development in the overall electronics industry, WMC devices continued to lag behind other devices in processing and/or storage capabilities.

In addition to physical limitations, power remains another major limitation in WMC devices. While the battery technology has seen dramatic improvement in recent years, it has generally been unable to keep up with the explosive growth in electronic technology. Therefore, battery power remains a major bottleneck in the operability of WMC device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing plurality of physical layers to retain quality of service in a wireless device during a single communication session, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing a plurality of physical layers to retain quality of service in a wireless device during a single communication session. A wireless mobile communication (WMC) device may comprise a plurality of physical layers. The plurality of physical layers may comprise a plurality of wireless technologies, for example, WiMAX, WiFi, cellular, and/or Bluetooth. The plurality of physical layers may also comprise a plurality of available transmission power levels within each available wireless technology. A quality of service (QOS) determination may be performed in the WMC device when transmitting and/or receiving data in the WMC device. The QOS determination may comprise determining required QOS attributes to complete the transmission and/or reception of data. The WMC device may select one or more of available physical layers in the WMC device that may enable achieving determined QOS in the course of the transmission and/or reception of data. QOS determination and/or selection of the physical layers may also comprise utilizing available power in the WMC device, and/or power requirement for performing the transmission and/or reception of data on the selected physical layers. Additionally, a plurality of data encoding schemes may also be utilized to reduce a size of communicated data while retaining the determined QOS.

A set of deadlines may be utilized to enable switching between available physical layers to ensure maintaining and/or achieving the required QOS. The WMC device may select a list of deadlines associated with data communication wherein an expiration of a deadline before successful completion of data communication may enable the WMC device to switch to another physical layer. The new physical layer may enable improved reliability and/or performance by utilizing an increased transmission power level, more reliable wireless technology, and/or a more efficient data encoding scheme.

Figure 1:
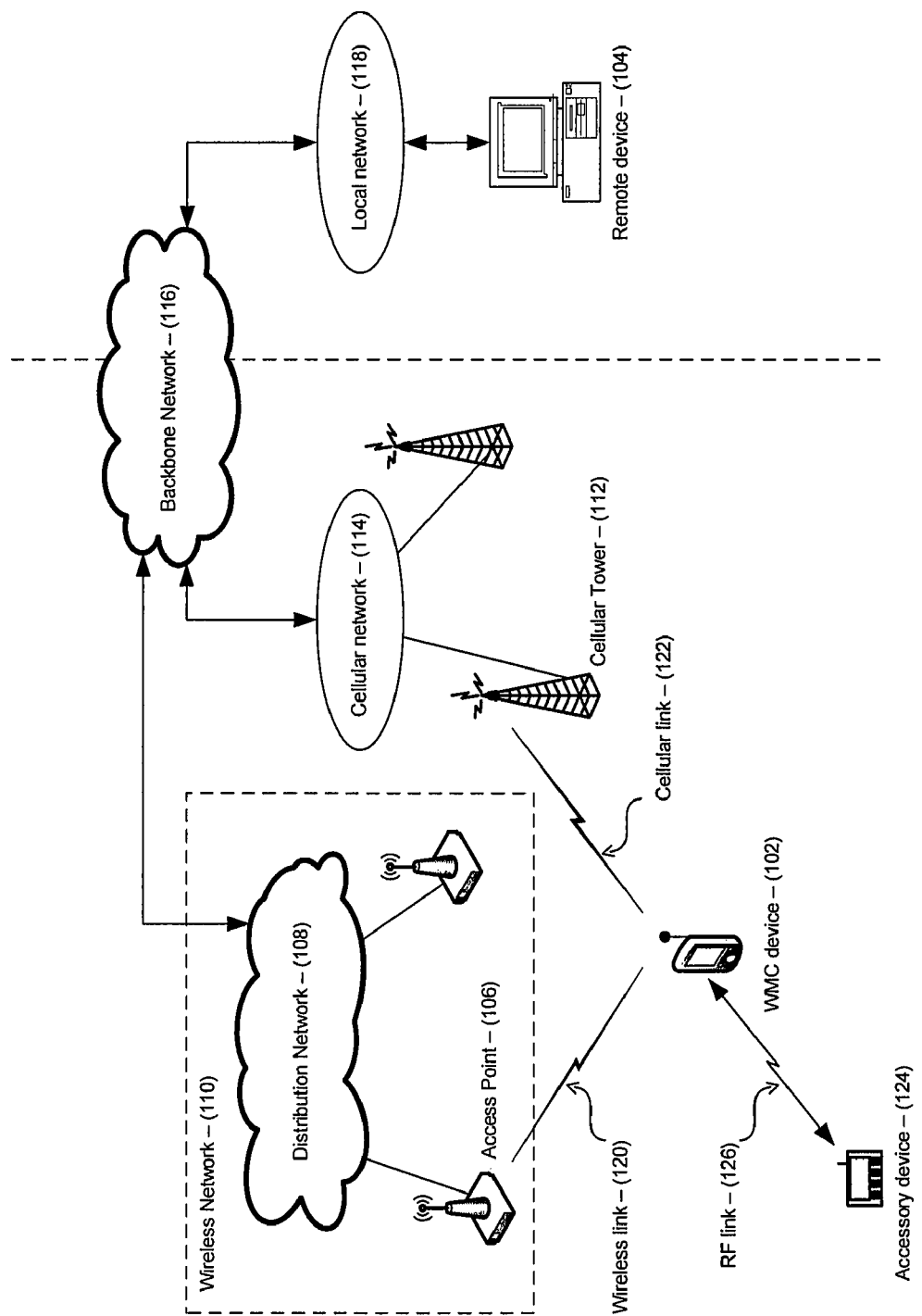
FIG. 1 is a block diagram that illustrates an exemplary model for setup that comprises a wireless mobile communication (WMC) device and a remote device, wherein the WMC device may utilize a plurality of physical layers, which may be utilized in accordance with an embodiment of the invention.

FIG. 1 is a block diagram that illustrates an exemplary model for setup that comprises a wireless mobile communication (WMC) device and a remote device, wherein the WMC device may utilize a plurality of physical layers, which may be utilized in accordance with an embodiment of the invention. Referring to FIG. 1, there is shown a WMC device 102, a remote device 104, an access point 106, a distribution network 108, a wireless network 110, a cellular tower 112, a cellular network 114, a backbone network 116, a local network 118, a wireless link 120, a cellular link 122, an accessory device 124, and a RF link 126.

The WMC device 102 may comprise suitable logic, circuitry and/or code that may enable performing wireless mobile communication. For example, the WMC device 102 may be utilized to perform voice, video and/or text message peer-to-peer communication. A WMC device may comprise an end user device or an end user terminal device comprising a user interface. The WMC device 102 may also perform additional functionality comprising internet browsing, and/or video streaming.

The remote device 104 may comprise suitable logic, circuitry and/or code that may be enabled to communicate to with the WMC device 102. The invention may not be limited to a specific remote device, but may comprise, for example, a general purpose processing device, a specialized processing device, a specialized peripheral device, or any combination of suitable hardware, and/or code, which may be enabled to perform a job requested by the WMC device 102. For example, the remote device may comprise a home PC comprising fast processing subsystems and increased memory space. Such a home PC may be better suited to perform processing and/or storage intensive tasks. For example, where necessary and/or feasible, the WMC device 102 may utilize the remote device 104 for Internet searches and/or for secure storage of data that may be created and/or maintained in the WMC device 102.

The wireless network 110 may comprise a plurality of the access point 106, the distribution network 108 and suitable logic, circuitry and/or code that may enable implementing a functional block corresponding to a wireless technology. Exemplary wireless technology may comprise for example the IEEE 802.11 (WLAN) or WiMAX (IEEE 802.16) architecture. The access point 106 may comprise suitable logic, circuitry, and/or code that may be utilized as access point necessary for the WMC device 102 to access the wireless network 110. The distribution network 108 may comprise suitable logic, circuitry, and/or code that may be adapted to operate as a backbone network that may be responsible for transport and link functionality for a plurality of access points in the wireless network 110.

The cellular network 114 may comprise a plurality of the cellular tower 112, and suitable logic, circuitry and/or code that may enable implementing a functional block corresponding to a cellular technology. Exemplary cellular technology may comprise cellular technologies that enable data services, including but not limited to, CDMA, WCDMA, CDMA1000, HSDPA, GSM, GPRS, EDGE, and UMTS.

The accessory device 124 may comprise suitable logic, circuitry and/or code that may enable performing some accessory functionality in conjunction with the use of the WMC device 102. For example, the accessory device may comprise a hands-free headset. The WMC device 102 may interact with the accessory device 124 over a short-range RF link 126. The RF link 126 may be based on a standardized technology for inter-device short range communication. For example, the RF link may correspond to a Bluetooth® connection or ZigBee connection between the accessory device 124 and the WMC device 102.

The local network 118 may comprise suitable logic, circuitry and/or code that may enable local connectivity. This local connectivity may comprise use of Local Area Network (LAN) technologies that enable data services, including but not limited to, IEEE 802.3 Ethernet. Other technologies may comprise WiMAX.

The backbone network 116 may comprise suitable logic, circuitry, and/or code that may be adapted to provide overall system connectivity between sub-networks. The wired network 116 may be enabled to interact with and connect different wired and/or wireless technologies. For example, the backbone network may comprise a standard telephony network (POTS) that may enable data connectivity between different interface nodes linking wired and/or wireless networks comprising WLAN networks, WiMAX networks, cellular networks, and/or LAN networks.

In operation, the WMC device 102 may utilize the wireless link 120 to access the wireless network 110 via the access point 106. The WMC device 102 may also utilize the cellular link 122 to access the cellular network 114 via the cellular tower 112. The WMC device 102 may communicate with the remote device 104 via the wireless network 110 through the access point 106 and the distribution network 108. The distribution network 108 may enable transport and/or routing of messages and/or data sent from, and to the WMC device 102. The backbone network 116 enables connectivity between local networks, for example wireless network 110, and cellular network 114. The remote device 104 may receive communication from the WMC device 102 by interacting with the backbone network 116. Various protocol-based operations may be performed to facilitate the transmission of information through all the different components. This may comprise use of such protocols such as IP, and/or SS7.

Once connected, the WMC device 102 may communicate with the remote device 104. The WMC device 102 may communicate data, information, and/or messages with the remote device 104. The data exchange between WMC device 102 and the remote 104 may be on behalf of another WMC device that may be in close operational proximity of the WMC device 102. The communication of data and/or messages between the WMC device 102 and the remote device 104 may enable utilizing the remote device 104 to perform tasks on behalf of the WMC device 102 and/or other WMC devices in operating proximity of the WMC device 102. The WMC device 102 may select, while performing data communication, one or more of a plurality of physical layers available to the WMC device 102. The plurality of physical layers may comprise the wireless link 120, cellular link 122, and the RF link 126. The plurality of physical layers may also comprise utilizing different transmission power levels within each of the available communication links.

Figure 2:
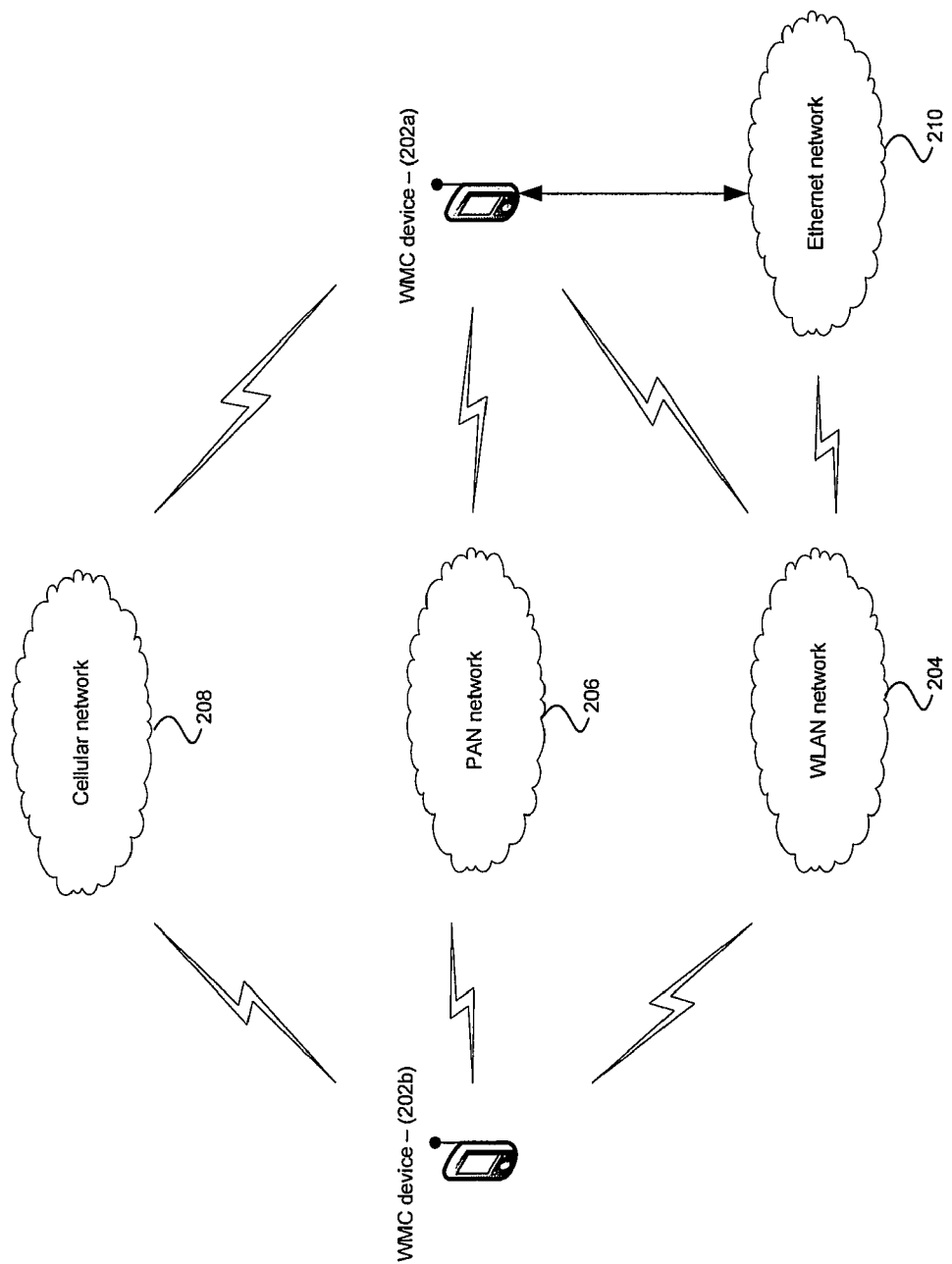
FIG. 2 is a diagram illustrating a plurality of wireless mobile communication (WMC) devices communicating utilizing a plurality of wireless standards, in accordance with an embodiment of the invention.

FIG. 2 is a diagram illustrating a plurality of wireless mobile communication (WMC) devices communicating utilizing a plurality of wireless standards, in accordance with an embodiment of the invention. Referring to FIG. 2 there are shown wireless mobile communication (WMC) WMC devices 202a and 202b, a WLAN network 204, a Bluetooth network 206, a cellular network 208, and an Ethernet network 210.

The wireless mobile communication (WMC) devices 202a and 202b may each be comprised similar to the WMC device 102. The WMC device 202a and 202b may also comprise suitable logic, circuitry, and/or code that may enable selection of quality of service for communication of data, and utilizing a plurality of physical layers to facilitate transmission and/or reception of data based on said quality of service. For example, in the exemplary embodiment of the invention shown in FIG. 1, where the WMC device 202a may be attempting to transmit data to the WMC device 202b, the WMC device 202a may be enabled to selected a QOS for the transmission of data, and may be enabled to transmit data via the WLAN network 204, PAN network 206, and/or the cellular network 208.

The WLAN network 204 may comprise one or more network nodes that may enable wireless transmission and/or reception of data adhering to a wireless networking standard such as IEEE 802.11. In this regard, the WLAN network 204 may comprise one or more nodes such as routers, bridges, switches, and end systems such as computers and wireless devices, for communicating information between a source and a destination.

The PAN network 206 may comprise one or more network nodes that may enable wireless transmission and/or reception of data based on the Bluetooth® (IEEE 802.15) or ZigBee standards/protocols. In this regard, the PAN network 206 may comprise a piconet or a scatternet which may enable communicating data between a source BT device and a destination BT device.

The cellular network 208 may be similar to the cellular network 112, substantially as described in FIG. 1. The cellular network 208 may enable the wireless transmission and/or reception of data, based on one or more cellular standards such as GSM/GPRS/EDGE, UMTS, and/or CDMA2000, among a plurality of devices, such as the WMC devices 202a and 202b, and one or more base stations for communicating information between a source device and a destination device.

The Ethernet network 210 may comprise one or more network nodes that may enable wireline transmission and/or reception of data adhering to Ethernet standards/protocols. In this regard, the Ethernet network 210 may comprise one or more nodes such as routers, bridges, switches, and end systems, for communicating information between a source node and a destination node.

In an exemplary operation, the WMC device 202a may generate data and/or receive data and/or messages from the remote device 104 via the Ethernet 210. The WMC device 202a may need to communicate data with the WMC device 202b. Accordingly, the WMC device 202a may transmit the data via the WLAN network 204, the PAN network 206, or the cellular network 208. The WMC devices 202a and 202b may also be enabled to communicate directly utilizing a device-to-device interface.

The WMC device 202a may determine a necessary quality of service (QOS) for data transmission to 202b. The QOS may enable defining minimal or maximal values for certain characteristics and/or parameters of the transmission. For example, the QOS may comprise maximum values for number of dropped packets, delay (latency) and/or errors, minimum bandwidth, and/or whether out-of-order delivery is acceptable. In general, the higher the QOS, the more reliable the transmission may be and/or the higher the bandwidth and/or the lower the latency that may be required. Additionally, an important factor in QOS determination may be power. Because WMC devices may have power limitations, which are generally due to use of batteries, power preservation may be an important factor considered while utilizing WMC devices.

The WMC device 202a may comprise a plurality of physical layers which may be available in communicating with WMC device 202b, and power requirements for utilizing each of these physical layers may vary. A physical layer may be defined by a plurality of factors that may comprise transmission power level, wireless technology utilized, and/or data encoding. Utilizing a higher transmission power level may enable achieving higher QOS because transmission range and/or susceptibility to interference may generally be improved with increased power of transmission. Data encoding may also enable improving security of transmission and/or decrease size of transmitted data due to data compression. Due to difference in the standards, implementation, and/or design, wireless technologies may have different power requirements to perform similar transmissions. For example, assuming that a transmission may be performed utilizing either WLAN or Bluetooth interfaces, utilizing Bluetooth generally may require less power battery draw than WLAN.

Once the WMC device 202a determines the necessary QOS to perform a data transmission to the WMC device 202b, the WMC device 202a may determine one or more suitable physical layers that may enable achieving said QOS. For example, the WMC device 202a may determine that the transmission may not be performed through PAN network 206, and that either the cellular network 204 and/or the WLAN network 208 must be utilized. The WMC device 202a may alter the size of data to be transmitted in order to conform to the required QOS. The WMC device 202a may utilize a data encoding scheme that enables reduction of the size of data to be transmitted. For example, converting a digital picture from *.bmp format to *.jpg format may substantially reduce the size of the data file. Smaller data files generally may require less power to transmit. Alternatively, the WMC device 202a may utilize redundancy bits to enable generating larger data files that may be utilized with the selected QOS.

In another embodiment, the WMC device 202a may select a list of deadlines associated with the transmission of data to the WMC device 202b. An expiration of a deadline in the WMC device 202a before receiving a confirmation from the WMC device 202b that the transmitted data was received may enable the WMC device 202a to switch to another physical layer. The new physical layer may enable improved reliability and/or performance by utilizing an increased transmission power level, more reliable wireless technology, and/or a more efficient data encoding scheme.

Figure 3:
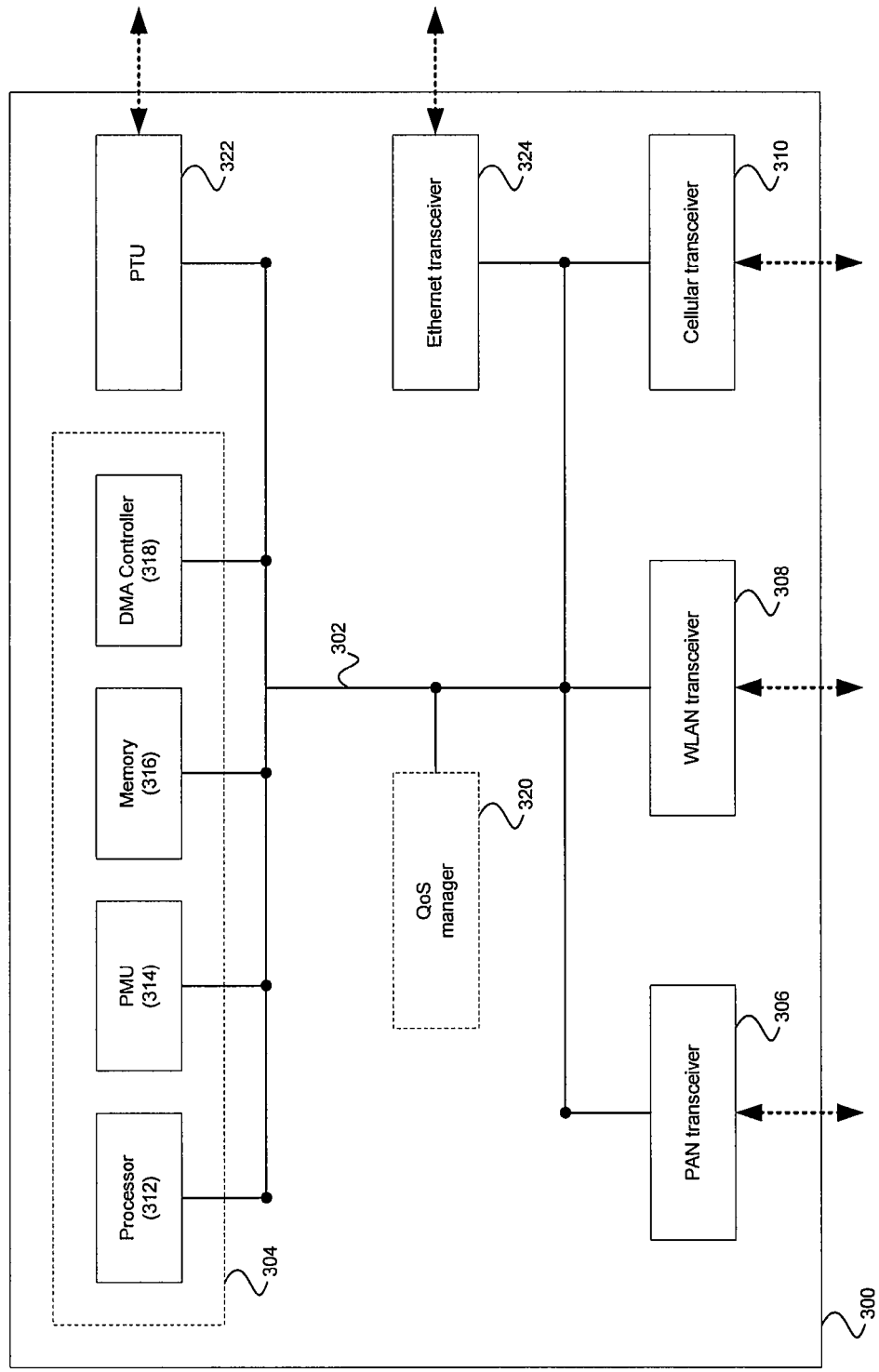
FIG. 3 is a block diagram of an exemplary single chip that enables performing quality of service (QOS) functionality utilizing a plurality of wireless standards, in accordance with an embodiment of the invention.

FIG. 3 is a block diagram of an exemplary single chip that enables performing quality of service (QOS) functionality utilizing a plurality of wireless standards, in accordance with an embodiment of the invention. Referring to FIG. 3, there is shown a system 300 that may comprise a common bus 302, a processor subsystem 304, a PAN transceiver 306, a WLAN transceiver 308, a cellular transceiver 310, a QOS manager 320, a peripheral transport unit (PTU) 322, and an Ethernet transceiver 324.

The common bus 302 may comprise suitable logic, circuitry, and/or code that may enable internal communication among the different subsystems and/or components of the system 300.

The processor subsystem 304 may comprise a central processing unit (CPU) 312, a power management unit (PMU) 314, a memory 316, and a direct memory access (DMA) controller 318. At least a portion of the components of the processor system 304 may be communicatively coupled via the common bus 302.

The CPU 312 may comprise suitable logic, circuitry, and/ or code that may enable control and/or management operations in the single system 300. In this regard, the CPU 312 may communicate control and/or management operations to the PAN transceiver 306, the WLAN transceiver 308, the cellular transceiver 310, the Ethernet transceiver 324, and/or the PTU 322 via a set of register locations specified in a memory map. Moreover, the CPU 312 may be utilized to process data received by the single system 300 and/or to process data to be transmitted by the single system 300. The CPU 312 may enable processing of data received via the PAN transceiver 306, the WLAN transceiver 308, the cellular transceiver 310, the Ethernet transceiver 324, and/or via the PTU 322. For example, the CPU 312 may enable processing of A2DP data received from the PAN transceiver 306 via the common bus 302. The CPU 312 may then transfer the processed A2DP data to other components of the system 300 via the common bus 302. The CPU 312 may enable processing of data to be transmitted via the PAN transceiver 306, the WLAN transceiver 308, the cellular transceiver 310, the Ethernet transceiver 324, and/or via the PTU 322.

The CPU 312 may be, for example, an ARM processor or another embedded processor core that may be utilized in the implementation of system-on-chip (SOC) architectures. The CPU 312 may enable providing one or more control signals to a hardware based QOS manager 320. The CPU 312 may also enable transferring data, and communicating requests between the QOS manager 320 and the various other blocks comprising the system 300. The PMU 314 may comprise suitable logic, circuitry, and/or code that may enable performing power-related operations. This may comprise assessing power resources, power availability, and/or power requirements for transmission and/or reception of data over any of available interfaces in system 300.

The memory 316 may comprise suitable logic, circuitry, and/or code that may enable data storage. In this regard, the memory 316 may be utilized to store data that may be utilized by the processor system 304 to control and/or manage the operations of the system 300. The memory 316 may also be utilized to store data received and/or transmitted by the system 300 via the PAN transceiver 306, the WLAN transceiver 308, the cellular transceiver 310, the Ethernet transceiver 324, and/or the PTU 322. Similarly, the memory 316 may be utilized to store data to be transmitted by the system 300 via the PAN transceiver 306, the WLAN transceiver 308, the cellular transceiver 310, the Ethernet transceiver 324, and/or the PTU 322. The DMA controller 318 may comprise suitable logic, circuitry, and/or code that may enable transfer of data directly to and from the memory 316 via the common bus 302 without involving the operations of the CPU 312. The memory 316 may enable storing data utilized by the QOS manager 320 to determine metrics, for example latency and throughput, of a network comprising the system 300.

The PAN transceiver 306 may comprise suitable logic, circuitry, and/or code that may enable performing wireless reception and/or transmission of data based on Bluetooth (IEEE 802.15) and/or ZigBee standards. In this regard, the PAN transceiver 306 may support amplification, filtering, modulation, and/or demodulation operations necessary for Bluetooth® communication. The PAN transceiver 306 may enable data to be transferred from and/or to the processor system 304, the PTU 322, the WLAN transceiver 308, the cellular transceiver 310 and/or the Ethernet transceiver 324 via the common bus 302, for example. The WLAN transceiver 308 may comprise suitable logic, circuitry, and/or code that may enable performing wireless reception and/or transmission of data based on a WLAN (IEEE 802.11) standard. In this regard, the WLAN transceiver 308 may support amplification, filtering, modulation, and/or demodulation operations necessary for WLAN communication. The WLAN transceiver 308 may enable data to be transferred from and/or to the processor system 304, the PTU 322, the PAN transceiver 306, the cellular transceiver 310 and/or the Ethernet transceiver 324 via the common bus 302, for example. The cellular transceiver 310 may comprise suitable logic, circuitry, and/or code that may enable performing wireless reception and/or transmission of data based on a cellular standard, which may comprise GSM/GPRS/EDGE, UMTS, and/or CDMA2000. In this regard, the cellular transceiver 310 may support amplification, filtering, modulation, and/or demodulation operations necessary for cellular communication, for example. The cellular transceiver 310 may enable data to be transferred from and/or to the processor system 304, the PTU 322, the Bluetooth transceiver, the WLAN transceiver 308, and/or the Ethernet transceiver 324 via the common bus 302, for example.

The QOS manager 320 may comprise suitable logic, circuitry, and/or code that may enable determining a QOS required for performing data transmission in a WMC device. In this regard, the QOS manager 320 may reside in dedicated hardware, or may comprise one or more blocks of code executed, for example, by the processor subsystem 304. The QOS manager 320 may determine, for example, based on a type of transmitted data and/or user specified criteria, at least maximum values for number of dropped packets, delay (latency) and/or errors; minimum bandwidth; and whether out-of-order delivery is acceptable associated with the transmission of data.

The PTU 322 may comprise suitable logic, circuitry, and/or code that may enable communication to and from the system 300 via a plurality of communication interfaces. In some instances, the PTU 322 may be implemented outside the system 300, for example. The PTU 322 may support analog and/or digital communication via at least one port. In this regard, the PTU 322 may comprise, for example, one or more USB interfaces, serial interfaces, analog audio outputs, digital audio outputs, and/or one or more proprietary interfaces. The Ethernet transceiver 324 may comprise suitable logic, circuitry, and/or code that may perform wireline reception and/or transmission of Ethernet packets. In this regard, the Ethernet transceiver 324 may comprise a physical network interface which may support amplification, filtering, modulation, and/or demodulation operations, for example. The Ethernet transceiver 324 may enable data to be transferred from and/or to the processor system 304, the PTU 322, the PAN transceiver 306, the WLAN transceiver 308, and/or the cellular transceiver 310 via the common bus 302, for example.

In operation, a WMC device may comprise the system 300. For example, the WMC device 202a, substantially as described in FIG. 2, may comprise the system 300. At any given time, the WMC device 202a may have access to one or more of the cellular network 204, the PAN network 206, the WLAN network 208, and/or the Ethernet network 210. The WMC device 202a may receive via the PTU 322 and/or the Ethernet transceiver 324 data and/or requests to perform data communication. Accordingly, when the WMC device 202a has data to transmit and/or receive, the system 300 may be utilized in performing any necessary data communication. In this regard, the WMC device 202a may take several factors into account when deciding when and how to transmit and/or receive data. For example, type, size, and/or destination of the data may all be factored into the decision of which network to utilize for transmitting and/or receiving data.

The WMC device 202a may utilize the QOS manager 320 in determining the necessary quality of service (QOS) for the data transmission and/or reception. The QOS manager 320 may determine desired maximum values for number of dropped packets, delay (latency) and/or errors; minimum bandwidth; and whether out-of-order delivery is acceptable associated with the transmission of data. The QOS manager 320 may also determine QOS-related parameters, such as latency and/or throughput, which each network may be able to provide at any given time. The processor subsystem 304 may enable determining a plurality of physical layers that may be available in the WMC device 202a. The plurality of physical layers may comprise physical layers that pertain to different network standards, for example cellular, WLAN, and/or PAN. The plurality of physical layers may also comprise physical layers that pertain to utilization of different transmission power levels within the same network standard. For example, the plurality of physical layers may comprise physical layers that pertain to utilizing Bluetooth standard with various transmission power levels within an available transmission range of the Bluetooth® standard. Based on required QOS parameters that may be determined by the QOS management 320, available QOS corresponding to each of available physical layers as determined by the QOS manager 320 and/or the processing subsystem 304, and/or availability of physical layers, the system 300 may select a physical layer that may be utilized to perform the data transmission and/or reception. Additionally, the plurality of physical layers may use a specific type of connectivity based on content and/or type of data that may be transferred via the connections. For example, the WMC device 202a and/or WMC device 202b may restrict audio data communication to physical layers via the cellular network 204 and/or the PAN network 206, while allowing video data communication on higher bandwidth physical layers, via the WLAN connection 208, for instance.

The QOS manager 320 and/or the CPU 312 may utilize the PMU 314 in QOS-related and/or physical layer selection operations. The PMU 314 may provide power-related information, which may comprise availability of power in the WMC device 202a and/or power requirement for transmitting and/or receiving data on available physical layers. Additionally, The WMC device 202a may alter the size of data to be transmitted in order to conform to the required QOS. For example, because smaller data files generally may require less power to transmit over a given time interval and distance, the WMC device 202a may utilize a data encoding scheme that enables reduction of the size of data to be transmitted and/or received. The processor subsystem 304 may enable utilizing digital data manipulations to reduce data size. For example, the processor subsystem 304 may enable converting the format of digital pictures, for instance from *.bmp format to *.jpg format, in order to reduce the size of digital picture files. Alternatively, where a higher QOS may be selected, the QOS manager 320 and/or processor subsystem 304 may utilize redundancy bits to enable generating larger data files that may be utilized with a selected QOS. For example, a low power QOS with a relatively high error rate may be selected along with redundancy coding of the data in order to enable reliable transmission of the data.

In another embodiment of the invention, the QOS manager 320 and/or the CPU 312 may determine a list of deadlines that relate to transmission and/or reception of data on selected one or more physical layers. Where a deadline may expire without completion of transmission and/or reception of data, a new physical layer may be utilized to re-attempt transmission and/or reception of data. The new physical layer may comprise improved QOS. Alternatively, the new physical layer may comprise utilizing higher transmission power level.

Figure 4A:
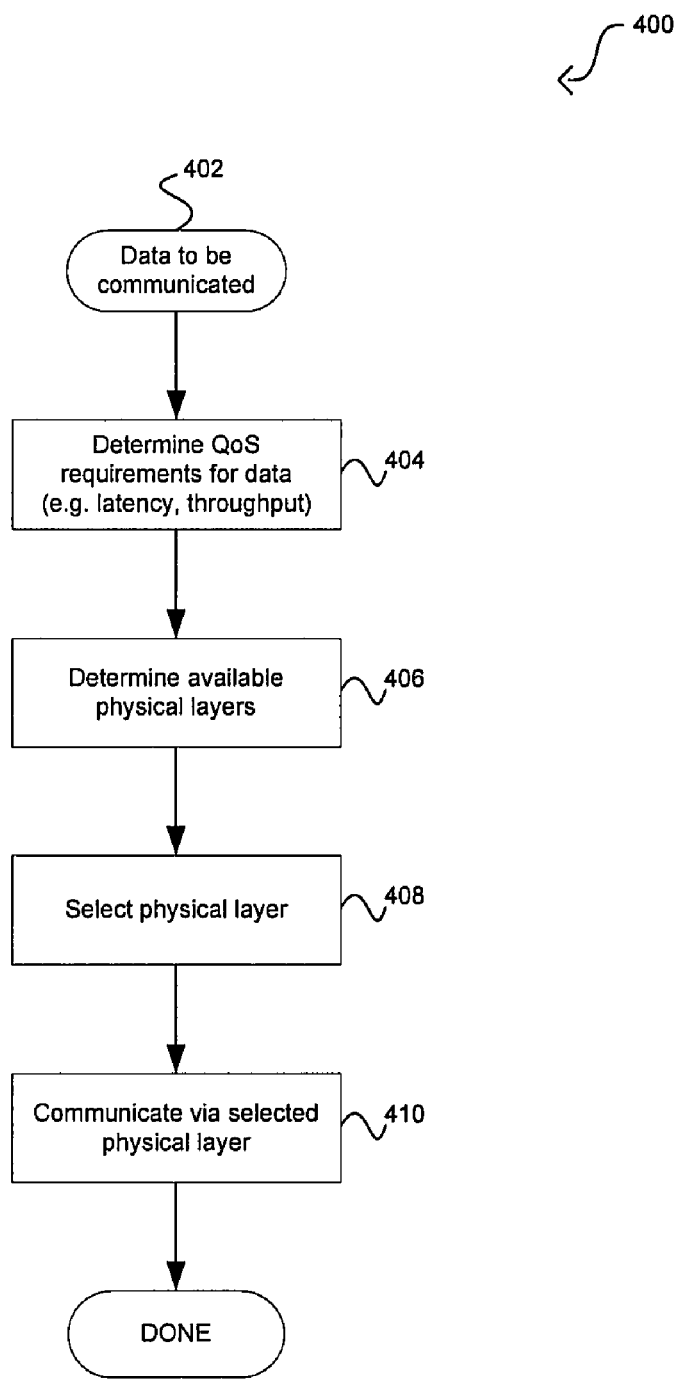
FIG. 4A is a flow chart that illustrates a WMC device utilizing a plurality of physical layers to perform quality of service (QOS) functionality, in accordance with an embodiment of the invention.

FIG. 4A is a flow chart that illustrates a WMC device utilizing a plurality of physical layers to perform quality of service (QOS) functionality, in accordance with an embodiment of the invention. Referring to FIG. 4A, there is shown flow chart 400. In step 402, the process may commence when WMC device 202a may have data that need be transmitted and/or received. In step 404, a QOS requirement for transmission and/or reception of data may be determined. The QOS manager 320 may determine maximum values for number of dropped packets, delay (latency) and/or errors; minimum bandwidth; and whether out-of-order delivery, in order to ensure successful transmission and/or reception of data. The QOS manager 320 may also determine QOS-related parameters of available wireless connections to the WMC device 202a. In step 406, a determination of the available physical layers in the WMC device 202a may be performed.

The WMC device 202a may comprise a plurality of physical layers that may be utilized for transmission and/or reception of data. The plurality of physical layers may comprise physical layers that pertain to different network standards, for example cellular, WLAN, and/or PAN. Additionally, the plurality of physical layers may also comprise physical layers that pertain to utilization of different transmission power levels within the same network standard. The processor subsystem 304 may be utilized to determine available physical layers in the WMC device 202a. In step 408, one or more physical layers may be selected to perform the transmission and/or reception of data. The selection of one or more physical layers may comprise utilizing the determined QOS in step 404 wherein a selected physical layer may be enabled to provide the determined QOS. Additionally, the selection of one or more physical layers may comprise power evaluation wherein the PMU 314 may be utilized to determine power availability in the WMC device 202a and/or power requirement for performing transmission and/or reception of data on potential physical layers. In step 410, transmission and/or reception of data may be performed via the one or more selected physical layers.

Figure 4B:
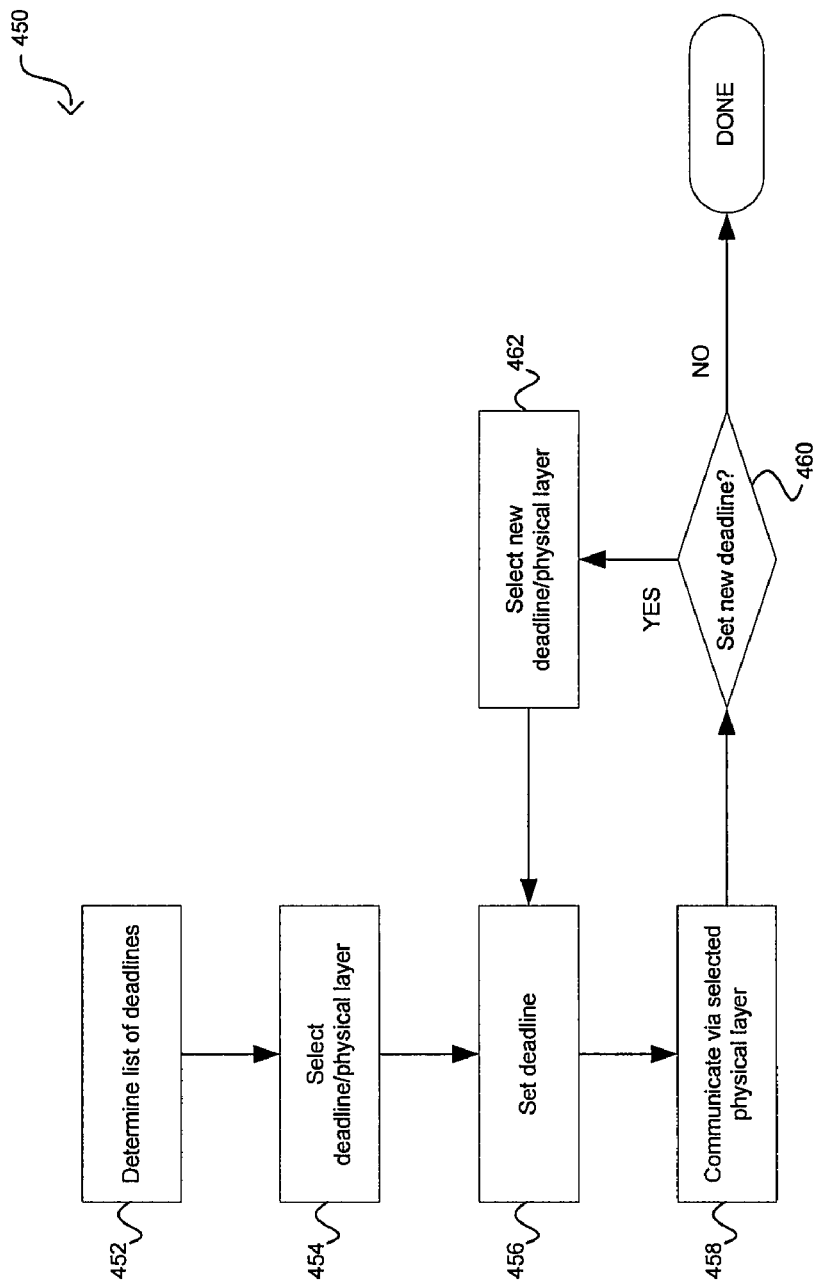
FIG. 4B is a flow chart that illustrates a WMC device utilizing a plurality of communication deadlines while performing quality of service (QOS) functionality, in accordance with an embodiment of the invention.

FIG. 4B is a flow chart that illustrates a WMC device utilizing a plurality of communication deadlines while performing quality of service (QOS) functionality, in accordance with an embodiment of the invention. Referring to FIG. 4B, there is shown flow chart 450. The process in this flow chart comprises utilizing a plurality of deadlines, which may be utilized in the course of performing transmission and/or reception of data in WMC device 202a, as substantially described in FIG. 4A. The flow chart 450 may commence after completion of steps 404 and 406 in FIG. 4A, wherein the QOS and available physical layers determination may have been completed. In step 452, a determination of a list of deadlines may be performed in the WMC device 202a. The deadlines may correlate with different physical layers wherein expiry of each deadline may enable switching to a physical layer that may enable improved reliability and/or performance by utilizing an increased transmission power level and/or different wireless technology.

In step 454, a deadline and physical layer may be selected for transmission and/or reception of data. The deadline may be selected from the list of deadlines determined in step 452. The physical layer may be selected from available physical layers in the WMC device 202a. The system 300 may enable selecting a physical layer that may enable completing the necessary transmission and/or reception of data within the selected deadline of the list of deadlines determined in step 452. The selection of the physical layer may comprise utilizing the QOS manager 320, the PMU 314, and/or other components in the system 300 to analyze required QOS, available QOS, available power, and/or required power for transmission and/or reception of data on the selected physical layer. In step 456, the selected deadline may be set. The system 300 may be utilized to perform operations related to setting the selected deadlines. The processor subsystem 304 may enable utilizing general clocking operations that may enable initiating and tracking time expiry based on the selected deadline. In step 458, transmission and/or reception of data may be performed via the selected physical layer. In step 460, a determination of whether to set a new deadline may be performed. In instances where the outcome of determination may indicate that a new deadline may be utilized, the process may proceed to step 462. In step 462, a new deadline and physical layer may be selected for transmission and/or reception of data. The new deadline may be an unused deadline from the list of deadline determined in step 452. The physical layer selection may be performed substantially as described in step 454.

Returning to step 460, the outcome of the determination whether to set a new deadline may indicate that no new deadline may be selected. This may be because no unused deadline remains of the list of deadlines determined in step 452, and/or due to completion of transmission and/or reception of data before expiry of the set deadline. The process may then complete, and an indication of the success and/or failure of the transmission and/or reception of data may be issued.

Various embodiments of the invention may comprise a method and system for utilizing a plurality of physical layers to retain quality of service in a wireless device during a single communication session. The WMC device 202a may comprise a plurality of physical layers. The plurality of physical layers may comprise a plurality of wireless technologies, for example, WiMAX, WiFi, cellular, and/or Bluetooth. The plurality of physical layers may also comprise a plurality of available transmission power levels within each available wireless technology. The system 300 may enable determining a quality of service (QOS) when transmitting and/or receiving data in the WMC device 202a. The QOS determination may comprise determining required QOS attributes to complete the transmission and/or reception of data. The QOS manager 320, the processor 304, and/or one or more of the PAN transceiver 306, the WLAN transceiver 308, and the cellular transceiver 310 may enable performing said QOS determination.

The WMC device 202a may select one or more of the plurality of physical layers that may enable achieving the determined QOS. Selection of the physical layers may additionally comprise utilizing available QOS in the physical layers, available power in the WMC device 202a, and/or power requirement for performing the transmission and/or reception of data on the selected physical layers. Additionally, the WMC device 202a may alter the size of data to be transmitted in order to conform to the required QOS. A plurality of data encoding schemes may also be utilized to reduced size of communicated data while retaining the determined QOS. Alternatively, redundancy bits may be utilized to increase the size of transmitted and/or communicated data where appropriate to conform to the required QOS. The system 300 may be utilized to perform selected data size alteration operations. A set of deadlines may be utilized to enable switching between available physical layers to ensure maintaining and/or achieving determined QOS. The system 300 may enable determining a list of deadlines associated with data communication wherein an expiration of a deadline before successful completion of data communication may enable the WMC device 202a to switch to another physical layer. The new physical layer may enable improved reliability and/or performance by utilizing an increased transmission power level, more reliable wireless technology, and/or a more efficient data encoding scheme.

Another embodiment of the invention may provide a machine-readable storage, having stored thereon, a computer program having at least one code section executable by a machine, thereby causing the machine to perform the steps as described herein for utilizing plurality of physical layers to retain quality of service in a wireless device during a single communication session.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
a processing subsystem, comprising a power management processor for managing power-related operations in the system;
a plurality of transceivers, comprising a personal area network (PAN) transceiver, a wireless local area network (WLAN) transceiver, a cellular transceiver, and an Ethernet transceiver; and
a quality of service (QOS) manager that is operable to manage QOS during data transmission in the system, wherein said QOS management comprises:
determining QOS criteria associated with said data transmission;
determining QOS related parameters associated with each of said plurality of transceivers;
selecting one of said plurality of transceivers for said data transmission based on evaluation of:
said determined QOS criteria for said data transmission;
said determination of QOS related parameters associated with use of each of said plurality of transceivers for said data transmission; and
power related parameters associated with use of each of said plurality of transceivers for said data transmission, wherein said power related parameters are determined by said power management processor.

2. The system of claim 1, wherein said QOS manager is operable to determine a deadline for said data transmission, wherein expiry of said deadline prior to completion of said data transmission allows for reselecting another one of said plurality of transceivers and/or modifying use of previously selected one of said plurality of transceivers.

3. The system according to claim 1, wherein said plurality of transceivers utilizes a plurality of transmission power levels.

4. The system according to claim 1, wherein said power-related parameters comprise power availability in said plurality of transceivers.

5. The system according to claim 1, wherein said QOS manager further comprises dynamically reselecting at least one of said plurality of transceivers during said data transmission to obtain a required quality of service.

6. The system according to claim 1, wherein said QOS manager further comprises selecting a plurality of deadlines that enable switching among said plurality transceivers to obtain a quality of service during said data transmission.

7. The system according to claim 6, wherein the QOS manager further comprises switching, after expiration of one of said deadlines, from a first transmission power level to a second transmission power level that is higher than the first transmission power level.

8. The system according to claim 6, wherein the QOS manager further comprises switching, after expiration of one of said deadlines, from a first transceiver to a second transceiver that enables improved reliability or performance compared to the first transceiver.

9. A system, comprising:
a power management processor operable to manage power-related operations in the system and to determine power-related parameters associated with use of each of a plurality of transceivers in data transmission;
a plurality of transceivers, comprising at least two transceivers selected from a personal area network (PAN) transceiver, a wireless local area network (WLAN) transceiver, and a cellular transceiver; and
a quality of service (QOS) manager that is operable to:
determine QOS criteria associated with data transmission by the system;
determine QOS related parameters associated with each of said plurality of transceivers; and
select one of said plurality of transceivers for said data transmission based on evaluation of:
said determined QOS criteria;
said determined QOS related parameters; and
power-related parameters associated with use of each of said plurality of transceivers for said data transmission.

10. The system according to claim 9, wherein said plurality of transceivers utilizes a plurality of transmission power levels.

11. The system according to claim 9, wherein said power-related parameters comprise power availability in said plurality of transceivers.

12. The system according to claim 11, wherein the QOS manager is further operable to switch, after expiration of one of a plurality of deadlines, from a first transmission power level to a second transmission power level that is higher than the first transmission power level.

13. The system according to claim 9, wherein said power-related parameters comprise a plurality of power resources available to said power management processor.

14. The system according to claim 9, wherein said power-related parameters comprise a power requirement of transmission and reception of data by the system.

15. A system, comprising:
a power management processor operable to manage power-related operations in the system;
a plurality of transceivers, comprising at least two transceivers selected from a personal area network (PAN) transceiver, a wireless local area network (WLAN) transceiver, and a cellular transceiver; and
a quality of service (QOS) manager operable to: determine QOS criteria associated with data transmission by the system; determine QOS related parameters associated with each of said plurality of transceivers; and
select one of said plurality of transceivers for said data transmission based on evaluation of:
said determined QOS criteria; and
said determination of QOS related parameters.

16. The system according to claim 15, wherein the QOS manager is further operable to alter a size of said data prior to said data transmission to achieve said required quality of service.

17. The system according to claim 16, wherein the QOS manager is further operable to utilize one or more encoding schemes to achieve said altering of said size of said data prior to said data transmission.

18. The system according to claim 17, wherein the QOS manager is further operable to dynamically re-encode, with a new encoding scheme, said data that utilized said one or more encoding schemes to achieve said altering of said size of said data prior to said data transmission.

19. The system according to claim 15, wherein the QOS manager is further operable to select at least one of said plurality of transceivers based on content of said data or type of said data.

20. The system according to claim 15, wherein the QOS manager is further operable to reselect at least one of said plurality of transceivers during said data transmission to obtain a required quality of service.

21. The system according to claim 15, wherein the QOS manager is further operable to select deadlines that enable switching among said plurality transceivers to obtain a quality of service during said data transmission.

22. The system according to claim 15, wherein the QOS manager is further operable to select deadlines that enable switching among said plurality transceivers to obtain a quality of service during said data transmission.

23. The system according to claim 15, wherein the QOS manager is further operable to switch between said transceivers after expiration of one of a plurality of deadlines, wherein the transceiver utilized after the expiration of said one of said deadlines enables improved reliability or performance as compared to the transceiver that was utilized prior to the expiration of said one of said deadlines.

24. The system according to claim 15, wherein said QOS criteria comprise at least one of a maximum value for a number of dropped packets, a packet latency, a minimum bandwidth, and whether out-of-order delivery is acceptable.

* * * * *